(12) United States Patent
Columbo et al.

(10) Patent No.: US 6,273,481 B1
(45) Date of Patent: Aug. 14, 2001

(54) CANINE PET WASTE RECOVERY AND DISPOSAL KIT

(76) Inventors: John Columbo; Frank Di Luzio, Jr., both of 3708 Babe Ct., Voorhees, NJ (US) 08043

( * ) Notice: Subject to any disclaimer, the term of this patent is extended or adjusted under 35 U.S.C. 154(b) by 0 days.

(21) Appl. No.: 09/544,428

(22) Filed: Apr. 7, 2000

(51) Int. Cl.[7] .................. A01K 29/00; E01H 1/12
(52) U.S. Cl. ............................. 294/1.3; 206/223
(58) Field of Search ............ 294/1.3, 1.4; 15/105, 15/257.1; 119/161, 867; 206/223

(56) References Cited

U.S. PATENT DOCUMENTS

| | | |
|---|---|---|
| D. 385,487 | 10/1997 | Gonthier . |
| 3,286,826 | 11/1966 | Stoll . |
| 3,639,937 * | 2/1972 | Sweeney ............................. 294/1.3 X |
| 4,186,955 * | 2/1980 | Campbell ............................. 294/1.3 |
| 4,230,354 | 10/1980 | Claras . |
| 4,350,274 * | 9/1982 | Morgan ............................. 294/1.3 X |
| 4,808,175 | 2/1989 | Hansen . |
| 4,917,238 * | 4/1990 | Schumacher ....................... 294/1.3 X |
| 4,974,893 | 12/1990 | Grahn . |
| 5,064,233 * | 11/1991 | Sloan ..................................... 294/1.3 |
| 5,193,684 | 3/1993 | Mcdonald . |
| 5,265,719 * | 11/1993 | Wand .................................... 206/223 |
| 5,447,227 * | 9/1995 | Koseberg ......................... 206/223 X |
| 5,713,616 * | 2/1998 | Knudson .............................. 294/1.3 |
| 6,129,096 * | 10/2000 | Johnson ............................ 294/1.3 X |

* cited by examiner

Primary Examiner—Johnny D. Cherry

(57) ABSTRACT

A canine pet waste recovery and disposal kit for providing components in a portable unit for cleaning up and disposing of the waste of a pet dog when walking the dog. The canine pet waste recovery and disposal kit includes a flexible bag having a mouth opening and a closure for closing the mouth opening of the bag, an absorbent towel being disposed in the bag, a pre-moistened towelette being disposed in the bag, and an edible dog treat being disposed in the bag.

3 Claims, 1 Drawing Sheet

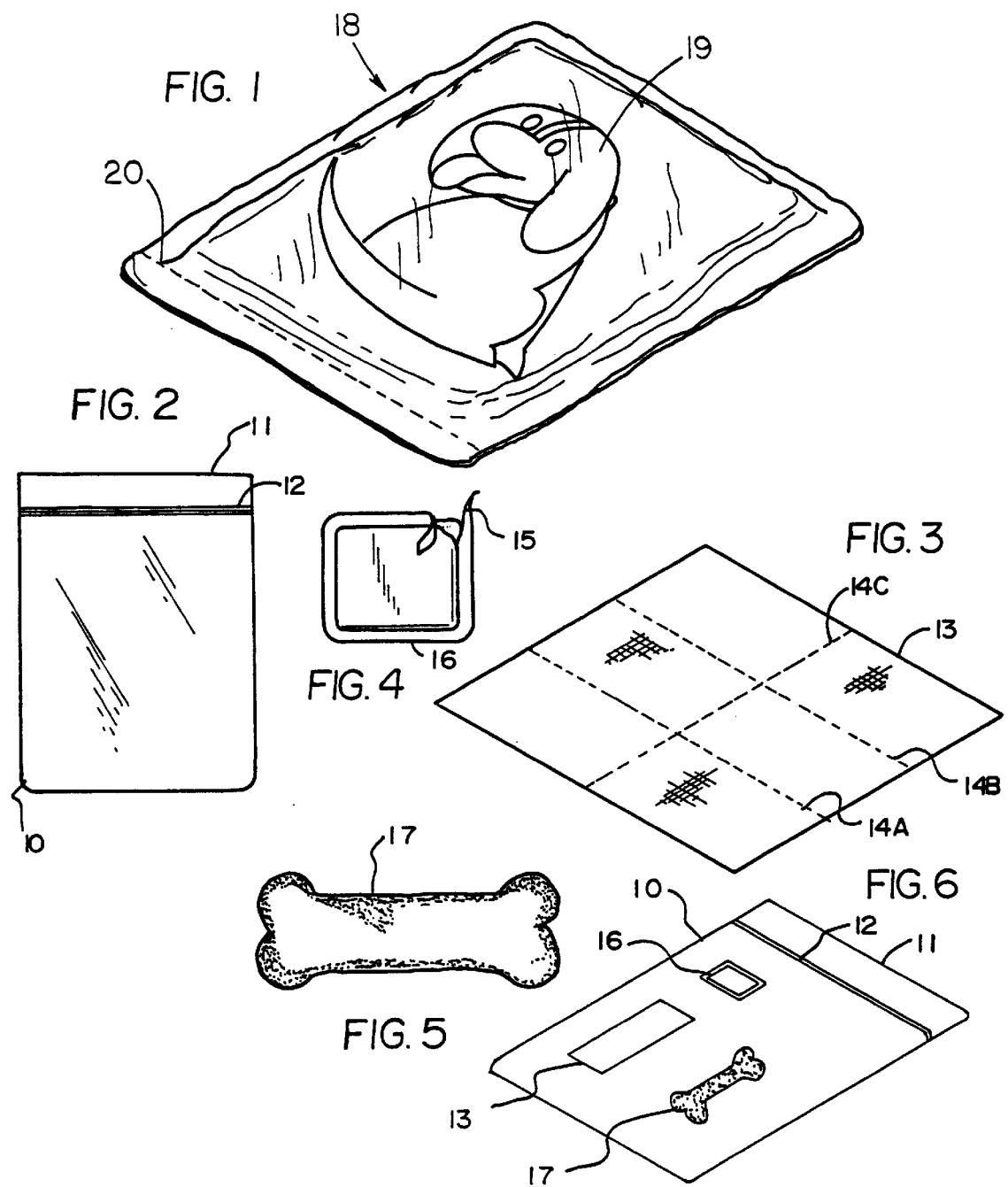

CANINE PET WASTE RECOVERY AND DISPOSAL KIT

BACKGROUND OF THE INVENTION

1. Field of the Invention

The present invention relates to pet waste recovery and disposal kits and more particularly pertains to a new canine pet waste recovery and disposal kit for providing components in a portable unit for cleaning up and disposing of the waste of a pet dog when walking the dog.

2. Description of the Prior Art

The use of pet waste recovery and disposal kits is known in the prior art. More specifically, pet waste recovery and disposal kits heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,974,893; U.S. Pat. No. 4,230,354; U.S. Pat. No. 3,286,826; U.S. Pat. No. 4,808,175; U.S. Pat. No. 5,193,684; and U.S. Pat. No. Des. 385,487.

While these devices fulfill their respective, particular objectives and requirements, the aforementioned patents do not disclose a new canine pet waste recovery and disposal kit. The inventive device includes a flexible bag having a mouth opening and a closure for closing the mouth opening of the bag, an absorbent towel being disposed in the bag a pre-moistened towelette being disposed in the bag, and an edible dog treat being disposed in the bag.

In these respects, the canine pet waste recovery and disposal kit according to the present invention substantially departs from the conventional concepts and designs of the prior art, and in so doing provides an apparatus primarily developed for the purpose of providing components in a portable unit for cleaning up and disposing of the waste of a pet dog when walking the dog.

SUMMARY OF THE INVENTION

In view of the foregoing disadvantages inherent in the known types of pet waste recovery and disposal kits now present in the prior art, the present invention provides a new canine pet waste recovery and disposal kit construction wherein the same can be utilized for providing components in a portable unit for cleaning up and disposing of the waste of a pet dog when walking the dog.

The general purpose of the present invention, which will be described subsequently in greater detail, is to provide a new canine pet waste recovery and disposal kit apparatus and method which has many of the advantages of the pet waste recovery and disposal kits mentioned heretofore and many novel features that result in a new canine pet waste recovery and disposal kit which is not anticipated, rendered obvious, suggested, or even implied by any of the prior art pet waste recovery and disposal kits, either alone or in any combination thereof.

To attain this, the present invention generally comprises a flexible bag having a mouth opening and a closure for closing the mouth opening of the bag, an absorbent towel being disposed in the bag, a pre-moistened towelette being disposed in the bag, and an edible dog treat being disposed in the bag.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new canine pet waste recovery and disposal kit apparatus and method which has many of the advantages of the pet waste recovery and disposal kits mentioned heretofore and many novel features that result in a new canine pet waste recovery and disposal kit which is not anticipated, rendered obvious, suggested, or even implied by and of the prior art pet waste recovery and disposal kits, either alone or in any combination thereof.

It is another object of the present invention to provide a new canine pet waste recovery and disposal kit which may be easily and efficiently manufactured and marketed.

It is a further object of the present invention to provide a new canine pet waste recovery and disposal kit which is of a durable and reliable construction.

An even further object of the present invention is to provide a new canine pet waste recovery and disposal kit which is susceptible of a low cost of manufacture with regard to both materials and labor, and which accordingly is then susceptible of low prices of sale to the consuming public, thereby making such canine pet waste recovery and disposal kit economically available to the buying public.

Still yet another object of the present invention is to provide a new canine pet waste recovery and disposal kit which provides in the apparatuses and methods of the prior art some of the advantages thereof, while simultaneously overcoming some of the disadvantages normally associated therewith.

Still another object of the present invention is to provide a new canine pet waste recovery and disposal kit for providing components in a portable unit for cleaning up and disposing of the waste of a pet dog when walking the dog.

Yet another object of the present invention is to provide a new canine pet waste recovery and disposal kit which includes a flexible bag having a mouth opening and a closure for closing the mouth opening of the bag, an absorbent towel being disposed in the bag, a pre-moistened towelette being disposed in the bag, and an edible dog treat being disposed in the bag.

Still yet another object of the present invention is to provide a new canine pet waste recovery and disposal kit that provides a sanitary means for cleaning and disposing of a dog's fecal waste.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of the outer packaging.

FIG. 2 is a schematic plan view of the bag of the present invention.

FIG. 3 is a schematic perspective view of the absorbent towel in an unfolded state.

FIG. 4 is a schematic plan view of the pre-moistened towelette in its wrapper with a corner of the wrapper torn off to reveal the towelette.

FIG. 5 is a schematic plan view of the dog treat.

FIG. 6 is a schematic perspective view of the components of the kit in the bag.

DESCRIPTION OF THE PREFERRED EMBODIMENT

With reference now to the drawings, and in particular to FIGS. 1 through 6 thereof, a new canine pet waste recovery and disposal kit embodying the principles and concepts of the present invention will be described.

As best illustrated in FIGS. 1 through 6, the canine pet waste recovery and disposal kit generally comprises a flexible bag having a mouth opening and a closure for closing the mouth opening of the bag. An absorbent towel, a pre-moistened towelette, and an edible dog treat are disposed in the bag.

In use, the kit has components for collecting and disposing of an animal's fecal waste, such as a canine pet's waste. Specifically, the kit includes a generally rectangular flexible bag 10 having a mouth opening 11 as illustrated in FIG. 2. The bag preferably comprises a pair of generally rectangular panels coupled together along outer perimeters of the panels with the panels defining the mouth opening.

The bag has a closure 12 for closing the mouth opening of the bag. Preferably, the closure of the bag comprises an interlocking ridge and channel closure for providing re-openable closure of the mouth opening. The interlocking ridge and a channel closure comprises a ridge portion extending along a portion of a mouth opening defined by one of the panels of the bag and a channel portion extending along another portion of a mouth opening defined by the other of the panels of the bag.

In an ideal illustrative embodiment, the bag has a width defined parallel to the interlocking ridge of about 7 inches and channel closure and a length defined perpendicular to the interlocking ridge and channel closure of about 9 inches. The bag is preferably folded in half such that the length of the bag is halved to about 4.5 inches.

With reference to FIG. 3, the kit also includes a generally rectangular absorbent towel 13 comprising an absorbent paper material. Preferably, the absorbent towel has a pleasant smelling scent applied thereto or impregnated therein. The absorbent towel is folded into a compact form having a plurality of fold lines 14a, 14b, 14c dividing the absorbent towel into a plurality of panels. Preferably, the plurality of fold lines of the absorbent towel comprises three fold lines such that the absorbent towel is divided into six panels. In the ideal illustrative embodiment, the absorbent towel has a length dimension of about 11 inches and a width dimension perpendicular to the length dimension of the absorbent towel of about 11 inches unfolded and a length of about 5.5 inches and a width about 3.6 inches when folded.

Turning to FIG. 4, the kit further includes a pre-moistened towelette 15 which is folded into a compact form and is enclosed in a tearable wrapper 16. The pre-moistened towelette is pre-moistened with a hand cleaner solution and a preferably pleasant smelling scent.

As illustrated in FIG. 6, the compact forms of the absorbent towel and the pre-moistened towelette are disposed in the bag along with a preferably bone-shaped edible dog treat 17 (FIG. 5) ideally having a fluoride treatment therein.

As best illustrated in FIG. 1, a generally rectangular tearable flexible outer packaging 18 encloses the folded-in-half bag with the towel, towelette and dog treat contained therein. The outer packaging may have a logo 19 or image displayed thereon. Even more preferably, the outer packaging has a row of perforations 20 for aiding tearing of the outer packaging.

Ideally, the components of the kit are all made out of biodegradable materials.

In use, the outer packaging is torn to permit removal of the bag from the outer packaging. The closure of the mouth opening of the bag is then opened to permit removal of the compact forms of the absorbent towel and the pre-moistened towelette and the edible dog treat from the bag. The user may then use the absorbent towel to collect and wipe up an animal's (such as a dog's) fecal waste deposited on a ground surface. Afterwards, the absorbent towel with the collected fecal waste may be deposited back into the bag once the waste has been collected.

After cleaning, the user may remove the pre-moistened towelette from the wrapper by tearing the wrapper. The user may then wipe clean their hands with the pre-moistened towelette. Like the absorbent towel, the user may deposit the used pre-moistened towelette into the bag after the user's hands have been cleaned therewith. After cleaning the animal's waste, the user may then also feed the edible dog treat to their pet dog.

Once the used towel and towelette are placed back in the bag, the closure of the bag may be used to re-close the mouth opening. The bag may be then be disposed in a refuse container.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A kit having components for collecting and disposing of an animal's fecal waste, said kit comprising:
    a generally rectangular flexible bag having a mouth opening comprising a pair of generally rectangular panels coupled together along outer perimeters of said panels, said panels of said bag defining said mouth opening;
    said bag having a closure for closing said mouth opening of said bag;
    wherein said closure of said bag comprises an interlocking ridge and channel closure for providing re-openable closure of said mouth opening, said interlocking ridge and channel closure comprising a ridge portion extending along a portion of a mouth opening defined by one of said panels of said bag and a channel portion extending along another portion of a mouth opening defined by the other of said panels of said bag;
    a generally rectangular absorbent towel comprising an absorbent paper material, wherein said absorbent towel has a scent applied thereto;
    said absorbent towel being folded into a compact form having a plurality of fold lines dividing said absorbent towel into a plurality of panels;
    wherein said plurality of fold lines of said absorbent towel comprises three fold lines such that said absorbent towel is divided into six panels;
    a pre-moistened towelette being folded into a compact form and being enclosed in a tearable wrapper;
    said compact forms of said absorbent towel and said pre-moistened towelette being disposed in said bag;
    a bone-shaped edible dog treat being disposed in said bag;
    a generally rectangular tearable flexible outer packaging enclosing said bag, said outer packaging having a logo displayed thereon, said outer packaging having a row of perforations for aiding tearing of said outer packaging;
    said outer packaging being adapted for tearing to permit removal of said bag from said outer packaging;
    said closure of said mouth opening of said bag being adapted for opening to permit removal of said compact forms of said absorbent towel and said pre-moistened towelette and said edible dog treat from said bag;
    said absorbent towel being adapted for collecting an animal's fecal waste deposited on a ground surface such that the absorbent towel and collected fecal waste may be disposed in said bag;
    said pre-moistened towelette being adapted for wiping the hands of a user and then disposing into said bag after the user's hands have been cleaned therewith;
    said edible dog treat being adapted for feeding to an animal; and
    said closure of said bag being adapted for closing said mouth of said bag with said absorbent towel with collected fecal waste and the used pre-moistened towelette contained therein.

2. A method for collecting and disposing of an animal's fecal waste, comprising the acts of:
    providing a kit comprising:
        a generally rectangular flexible bag having a mouth opening, comprising a pair of generally rectangular panels coupled together along outer perimeters of said panels, said panels of said bag defining said mouth opening;
        said bag having a closure for closing said mouth opening of said bag;
        wherein said closure of said bag comprises an interlocking ridge and channel closure for providing re-openable closure of said mouth opening, said interlocking ridge and channel closure comprising a ridge portion extending along a portion of a mouth opening defined by one of said panels of said bag and a channel portion extending along another portion of a mouth opening defined by the other of said panels of said bag;
        a generally rectangular absorbent towel comprising an absorbent paper material, wherein said absorbent towel has a scent applied thereto;
        said absorbent towel being folded into a compact form having a plurality of fold lines dividing said absorbent towel into a plurality of panels;
        wherein said plurality of fold lines of said absorbent towel comprises three fold lines such that said absorbent towel is divided into six panels;
        a pre-moistened towelette being folded into a compact form and being enclosed in a tearable wrapper;
        said compact forms of said absorbent towel and said pre-moistened towelette being disposed in said bag;
        a bone-shaped edible dog treat being disposed in said bag;
        a generally rectangular tearable flexible outer packaging enclosing said bag, said outer packaging having a logo displayed thereon, said outer packaging having a row of perforations for aiding tearing of said outer packaging;
    tearing said outer packaging to permit removal of said bag from said outer packaging;
    opening said closure of said mouth opening of said bag to permit removal of said compact forms of said absorbent towel and said pre-moistened towelette and said edible dog treat from said bag;
    collecting an animal's fecal waste deposited on a ground surface with said absorbent towel;
    disposing the absorbent towel and collected fecal waste in said bag;
    wiping the hands of a user with said pre-moistened towelette;
    disposing the used pre-moistened towelette into said bag after the user's hands have been cleaned therewith;
    feeding said edible dog treat to the animal; and
    closing said mouth of said bag with said closure after said absorbent towel with collected fecal waste and the used pre-moistened towelette have been deposited therein.

3. A kit having components for collecting and disposing of an animal's fecal waste, said kit comprising:

a generally rectangular flexible bag having a mouth opening, comprising a pair of generally rectangular panels coupled together along outer perimeters of said panels, said panels of said bag defining said mouth opening;

said bag having a closure for closing said mouth opening of said bag;

wherein said closure of said bag comprises an interlocking ridge and channel closure for providing re-openable closure of said mouth opening, said interlocking ridge and channel closure comprising a ridge portion extending along a portion of a mouth opening defined by one of said panels of said bag and a channel portion extending along another portion of a mouth opening defined by the other of said panels of said bag;

a generally rectangular absorbent towel comprising an absorbent paper material, wherein said absorbent towel has a scent applied thereto;

said absorbent towel being folded into a compact form having a plurality of fold lines dividing said absorbent towel into a plurality of panels;

a pre-moistened towelette being folded into a compact form and being enclosed in a tearable wrapper;

said compact forms of said absorbent towel and said pre-moistened towelette being disposed in said bag;

a bone-shaped edible dog treat being disposed in said bag;

a generally rectangular tearable flexible outer packaging enclosing said bag, said outer packaging having a logo displayed thereon, said outer packaging having a row of perforations for aiding tearing of said outer packaging;

said outer packaging being adapted for tearing to permit removal of said bag from said outer packaging;

said closure of said mouth opening of said bag being adapted for opening to permit removal of said compact forms of said absorbent towel and said pre-moistened towelette and said edible dog treat from said bag;

said absorbent towel being adapted for collecting an animal's fecal waste deposited on a ground surface such that the absorbent towel and collected fecal waste may be disposed in said bag;

said pre-moistened towelette being adapted for wiping the hands of a user and then disposing into said bag after the user's hands have been cleaned therewith;

said edible dog treat being adapted for feeding to an animal; and said closure of said bag being adapted for closing said mouth of said bag with said absorbent towel with collected fecal waste and the used pre-moistened towelette contained therein.

\* \* \* \* \*